(12) United States Patent
Kim

(10) Patent No.: US 7,486,347 B2
(45) Date of Patent: Feb. 3, 2009

(54) LIQUID CRYSTAL DISPLAY DEVICE

(75) Inventor: Jung Soo Kim, Gyeongsangbuk-do (KR)

(73) Assignee: LG Display Co. Ltd., Seoul (KR)

( * ) Notice: Subject to any disclaimer, the term of this patent is extended or adjusted under 35 U.S.C. 154(b) by 270 days.

(21) Appl. No.: 11/369,744

(22) Filed: Mar. 8, 2006

(65) Prior Publication Data

US 2006/0203142 A1    Sep. 14, 2006

(30) Foreign Application Priority Data

Mar. 8, 2005    (KR) .................. 10-2005-0019295

(51) Int. Cl.
*G02F 1/1333* (2006.01)
*G02F 1/1345* (2006.01)

(52) U.S. Cl. ............... 349/58; 349/149; 349/150

(58) Field of Classification Search .............. 349/58, 349/149, 150
See application file for complete search history.

(56) References Cited

U.S. PATENT DOCUMENTS

| 6,512,514 | B1 | 1/2003 | Warashina et al. | 345/206 |
| 6,686,979 | B2 | 2/2004 | Yoshino | 349/58 |
| 2004/0070721 | A1* | 4/2004 | Tsubokura et al. | 349/149 |
| 2004/0119906 | A1* | 6/2004 | Hong et al. | 349/58 |

FOREIGN PATENT DOCUMENTS

CN    1296752 C    9/2003

* cited by examiner

*Primary Examiner*—Michael H Caley
(74) *Attorney, Agent, or Firm*—Morgan Lewis & Bockius LLP

(57) ABSTRACT

A liquid crystal display (LCD) device includes an LCD panel, a printed circuit board, and a guide panel which supports the LCD panel and to which the printed circuit board is fixed, wherein the guide panel has at least one rib to hold the printed circuit board.

6 Claims, 10 Drawing Sheets

LIQUID CRYSTAL DISPLAY DEVICE

This application claims the benefit of the Korean Patent Application No. P2005-0019295 filed in Korea on Mar. 8, 2005, which is hereby incorporated by reference.

BACKGROUND OF THE INVENTION

1. Field of the Invention

The present invention relates to a liquid crystal display device, and more particularly, to a liquid crystal display device with a structure that is capable of firmly fixing a printed circuit board.

2. Discussion of the Related Art

In general, a liquid crystal display (LCD) device typically includes a flat panel display that controls light transmission in response to a video signal to display a picture. The LCD device is widely utilized because of its advantageous characteristics such as lightness, thinness, low power consumption, etc. Recently, the LCD has been designed to have a large-screen and high precision so as to be optimum for office automation equipment, a notebook computer and the like.

An example of such an LCD device is an active matrix type LCD device that is provided with a thin film transistor (TFT) made of amorphous silicon or crystalline silicon as a switching device. The active matrix type LCD device includes an LCD panel, a driving circuit for the LCD panel, a backlight unit and a printed circuit board (PCB), which are assembled together as a liquid crystal module.

The LCD panel includes signal input pads, and the PCB includes output pads. The driving circuit for the LCD panel includes a data driver integrated circuit (IC) and a gate driver IC, which are mounted on a tape carrier package (TCP). The TCP has its own output pads electrically connected to the signal input pads of the LCD panel and has its own input pads electrically connected to the output pads of the PCB.

FIG. 1 is a perspective plan view schematically illustrating an LCD module according to the related art. As shown in FIG. 1, the LCD module includes an LCD panel 2 for displaying a picture, a PCB 20, a TCP 22 stuck to both of the PCB 20 and the LCD panel 2, a guide panel 4 for supporting the edge of the LCD panel 2 and having the PCB 20 fixed thereto, and a backlight unit 10 for illuminating light to the LCD panel 2.

FIG. 2 is a schematic diagram illustrating a structure of fixing the PCB 20 to the guide panel 4 according to the related art. As shown in FIG. 2, the guide panel 4 includes a plurality of protrusions 15 (only one is shown) formed for fixing the PCB 20 on a side surface of the guide panel 4. The PCB includes a plurality of holes 18 (only one is shown) corresponding to the respective protrusions 15. The PCB 20 is fixed to the guide panel such that the TCP 22 is bent to make the PCB 20 face a side surface of the guide panel 4, and then, the protrusion 15 of the guide panel 4 is inserted into the hole 18 formed in the PCB 20. According to this structure of the related art, the LCD panel 2 of FIG. 1 can move in an arrow mark direction in FIG. 2, thereby taking off the protrusion 15 from the hole 18 to separate the PCB 20 from the guide panel 4.

However, the related art structure brings about a problem in that moving friction between the PCB 20 and the other peripheral devices can cause damage to the PCB 20. To solve the problem, as shown in FIG. 3, a silicon pad 25, over which an adhesive is spread, may be used to fix the PCB 20 to the guide panel 4. However, the adhesive on the silicon pad 25 hardens with time passing by, thereby reducing the adhesive strength of the silicon pad 25. Moreover, the addition of the silicon pad 25 increases the manufacturing costs and also complicates the processes.

SUMMARY OF THE INVENTION

Accordingly, the present invention is directed to a liquid crystal display (LCD) device that substantially obviates one or more problems due to limitations and disadvantages of the related art.

An object of the present invention is to provide an LCD device that is capable of firmly fixing a printed circuit board.

Another object of the present invention is to provide an LCD device with the structure of firmly fixing a printed circuit board, which can be manufactured without increasing costs or complicating the manufacturing processes.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device according to an aspect of the present invention includes a LCD panel, a printed circuit board, and a guide panel which supports the LCD panel and to which the printed circuit board is fixed, wherein the guide panel is provided with at least one rib to hold the printed circuit board.

In another aspect, the LCD device includes a LCD panel, a printed circuit board, and a guide panel which supports the LCD panel and to which the printed circuit board is fixed, wherein the guide panel is provided with at least one upper rib to hold an upper part of the printed circuit board and at least one lower rib to hold a lower part of the printed circuit board.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
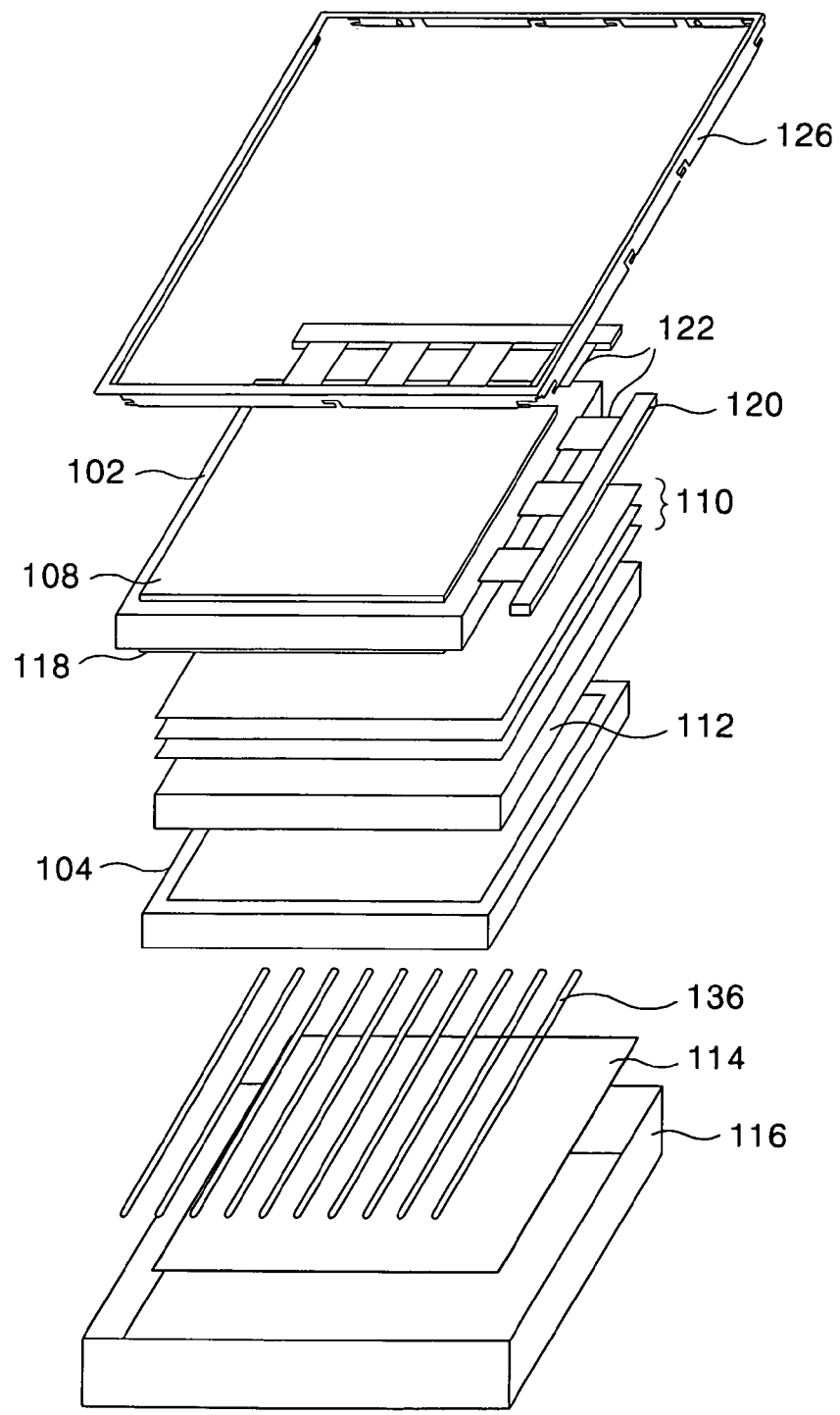
FIG. 4 is a perspective diagram schematically illustrating an LCD device according to an exemplary embodiment of the present invention.

FIG. 4 is a diagram schematically illustrating a liquid crystal display (LCD) devic according to an exemplary embodiment of the present invention. As shown in FIG. 4, the LCD device includes an LCD panel 102 for display a picture, a printed circuit board (PCB) 120, a tape carrier package (TCP) 122 for transmitting a signal generated from the PCB 120 to the LCD panel 102, a backlight unit for irradiating light to the LCD panel 102, a guide panel 104 for supporting both of the LCD panel 102 and the PCB 120, and a top case 126 for protecting the edge of the LCD panel 102 and the guide panel 104.

The LCD panel 102 includes liquid crystal cells arranged in an active matrix shape between an upper glass substrate and a lower glass substrate. Also, the LCD panel 102 is provided with a thin film transistor (TFT) that is formed in each of the liquid crystal cells to switch a video signal. The refractive index of each liquid crystal cell is changed in accordance with the video signal, thereby displaying a picture corresponding to the video signal. A tape carrier package (TCP) 122 on which a driver IC is mounted is stuck onto the lower glass substrate of the LCD panel 102. Polarizing sheets 108, 118 for filtering a linearly polarized light are each installed on front and rear surfaces of the LCD panel 102.

A backlight unit includes a plurality of lamps 136 that are disposed under the LCD panel 102 and emit light in response to an AC driving signal, a bottom cover 116 that houses the lamps 136 and has a reflection plate 114 attached to its bottom surface, a diffusion plate 112 that covers the bottom cover 116 in which the lamps 136 are housed, and a plurality of optical sheets 110 that are deposited between the diffusion plate 112 and the LCD panel 102. The diffusion plate 112 diffuses light incident from the lamps 136. The plurality of optical sheets 110 include at least one prism sheet and at least one diffusion sheet to increase uniformity and efficiency of the light incident to the LCD panel 102.

Figure 5:
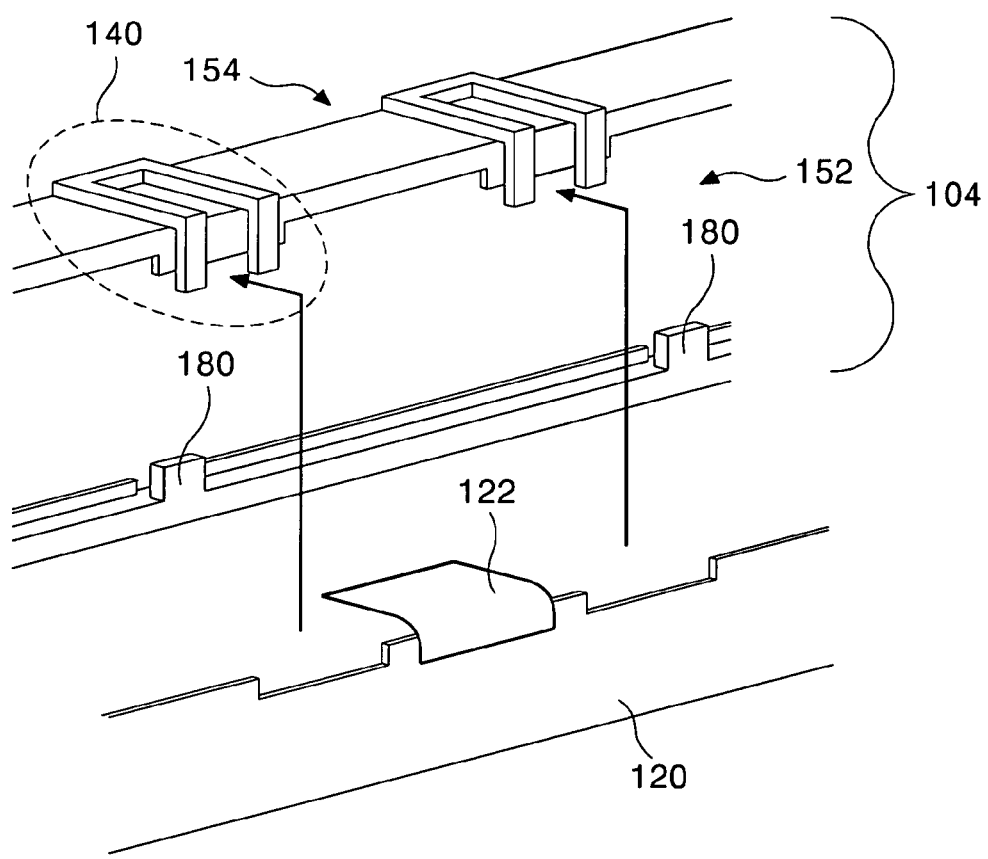
FIG. 5 is a schematic diagram illustrating an exemplary structure of fixing a PCB to a guide panel in the LCD device of FIG. 4.
Figure 6:
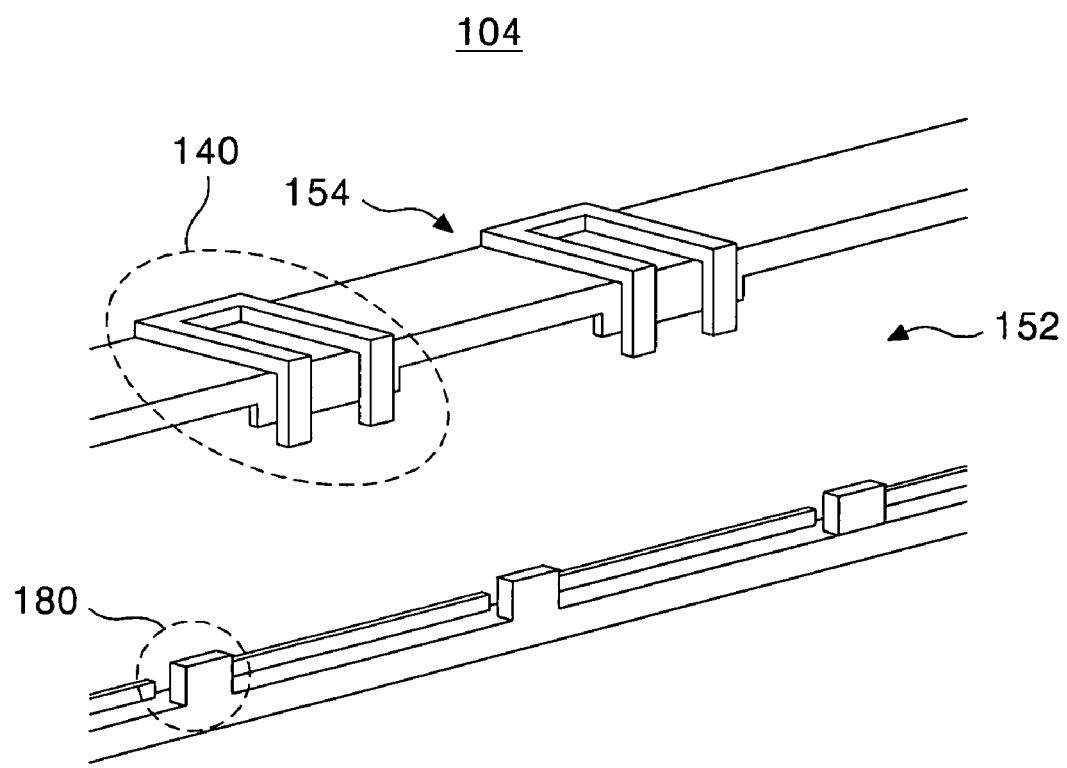
FIG. 6 is a schemtic diagram illustrating another exemplary structure of fixing a PCB to a guide panel in the LCD device of FIG. 4.
Figure 7:
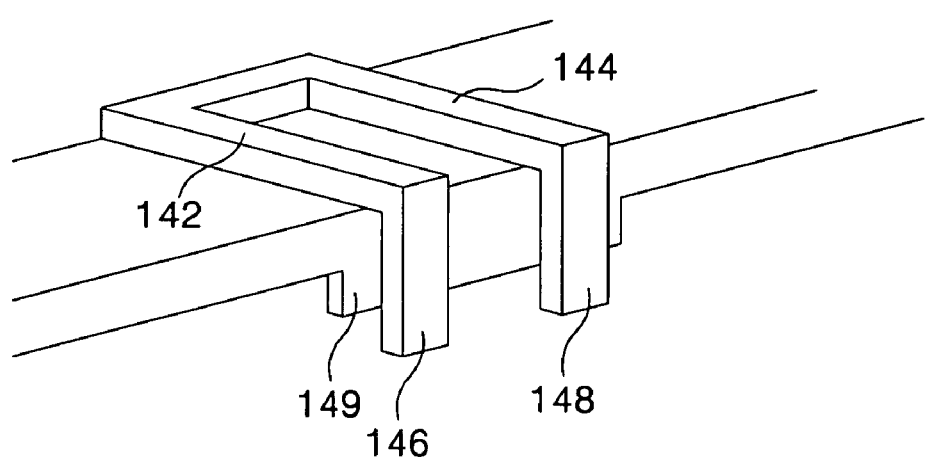
FIG. 7 is a perspective plan view schematically showing an enlarged upper rib of the guide panel of FIGS. 5 and 6.

FIGS. 5 to 7 are schematic diagrams illustrating exemplary structures of fixing the PCB 120 to the guide panel 104 according to the exemplary embodiment of the present invention. As shown in FIGS. 5 to 7, a first groove 152 for receiving the PCB 120 is formed in an outer surface of the guide panel 104. A plurality of upper ribs 140 (two shown in FIG. 5 for example) are formed on upper and side surfaces of an upper end of the guide panel 104. A plurality of lower ribs 180 (two shown in FIG. 5 and three shown in FIG. 6 for example) are formed in a lower end of the guide panel 104. A second groove 154 where the TCP 122 connected to the PCB 120 is placed is provided between the two upper ribs 140.

The upper ribs 140 serve to safely guide both sides of the bendable TCP 122 and fix the upper end of the PCB 120, which faces a side surface of the guide panel 104, to the guide panel 104. Moreover, as shown in FIG. 7, each of the upper ribs 140 includes first and second protrusions 142, 144 projected with a designated height in the upper surface of the guide panel 104, and third and fourth protrusions 146, 148 bent by 90° in the end of each of the first and second protrusions 142, 144 to face the side surface of the guide panel 104. The upper ribs 140 and the lower ribs 180 may be disposed at locations facing each other in a one-to-one relationship in the guide panel 104, or may be disposed in a zigzag shape.

Figure 8:
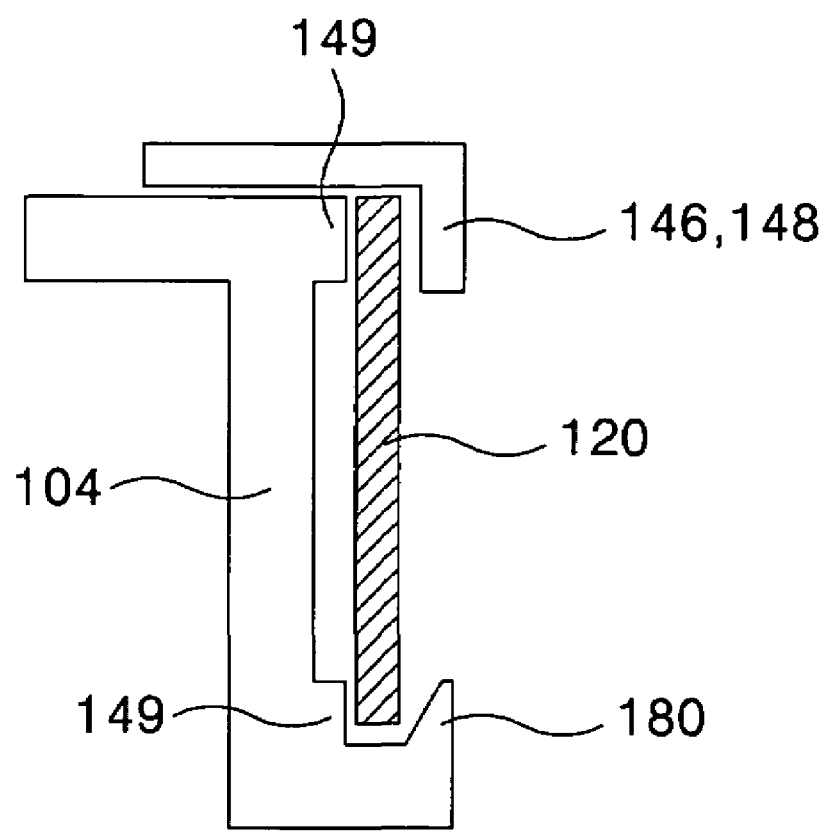
FIG. 8 is a sectional diagram schematically illustrating a state in which the PCB is fixed to the guide panel.
Figure 9:
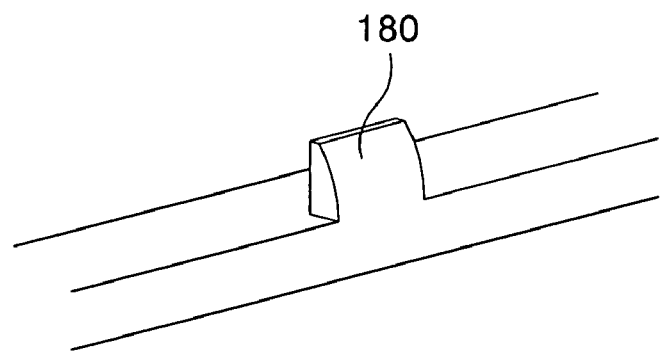
FIG. 9 is a perspective plan view schematically illustrating various exemplary embodiments of a lower rib of the guide panel.
Figure 9:
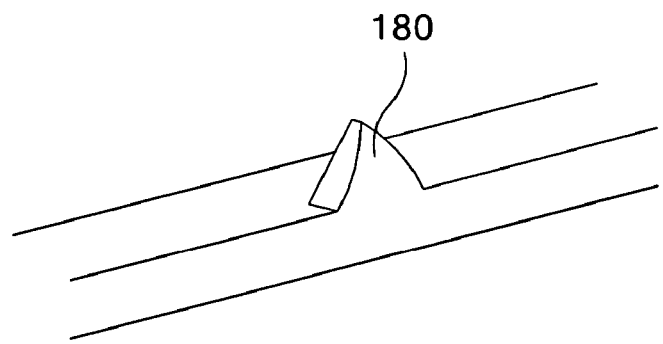
Figure 9:
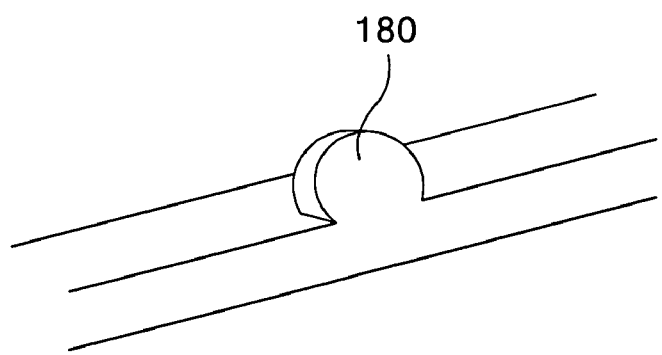

FIG. 8 is a sectional diagram schematically illustrating a state in which the PCB 120 is fixed to the guide panel 104. As shown in FIG. 8, the guide panel 104 is provided with two PCB supporting plates 149, which are formed in upper and lower parts of the guide panel 104 and are projected with a designated thickness. Each of the PCB supporting plates 149 is separated from the upper rib 140 and the lower rib 180 with a gap of not less than the PCB thickness therebetween. Thus, one end of the PCB 120 is able to be inserted into a space between the PCB supporting plate 149 of the upper part and the third and fourth protrusions 146, 148, while the other end of the PCB 120 is able to be inserted into a space between the PCB supporting plate 149 of the lower part and the lower rib 180. Moreover, as shown in FIG. 9, in such a fixing structure of the exemplary embodiment, the lower rib 180 may be made in various shapes such as tetragonal protrusion, triangular protrusion, circular protrusion or the like. The upper rib 140 may also be made in various shapes.

Figure 10:
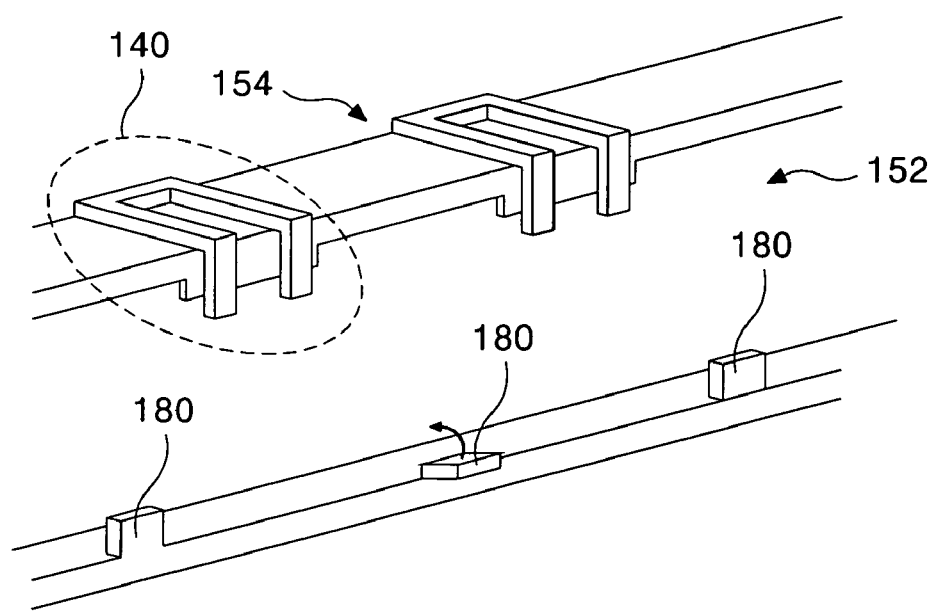
FIG. 10 is a perspective plan view schematically illustrating a rotative movement of the lower rib of the guide panel.

In the exemplary embodiment, as shown in FIG. 8, the lower rib 180 may be slanted outward so that the PCB 120 and the guide panel 104 are able to be assembled easily. Further, the lower rib 180 may be formed to get thinner as it goes upward. As shown in FIG. 10 for example, the lower rib 180 may be installed to the guide panel 104 so that it is able to move rotatively in a hinge shape inclusive of an elastic member such as ring spring, leaf spring, V-spring, etc. The upper rib 140 may be installed to the guide panel 104 so that it is able to move rotatively in the hinge shape, thereby making the assembly of the PCB 120 and the guide panel 104 easy.

Figure 1:
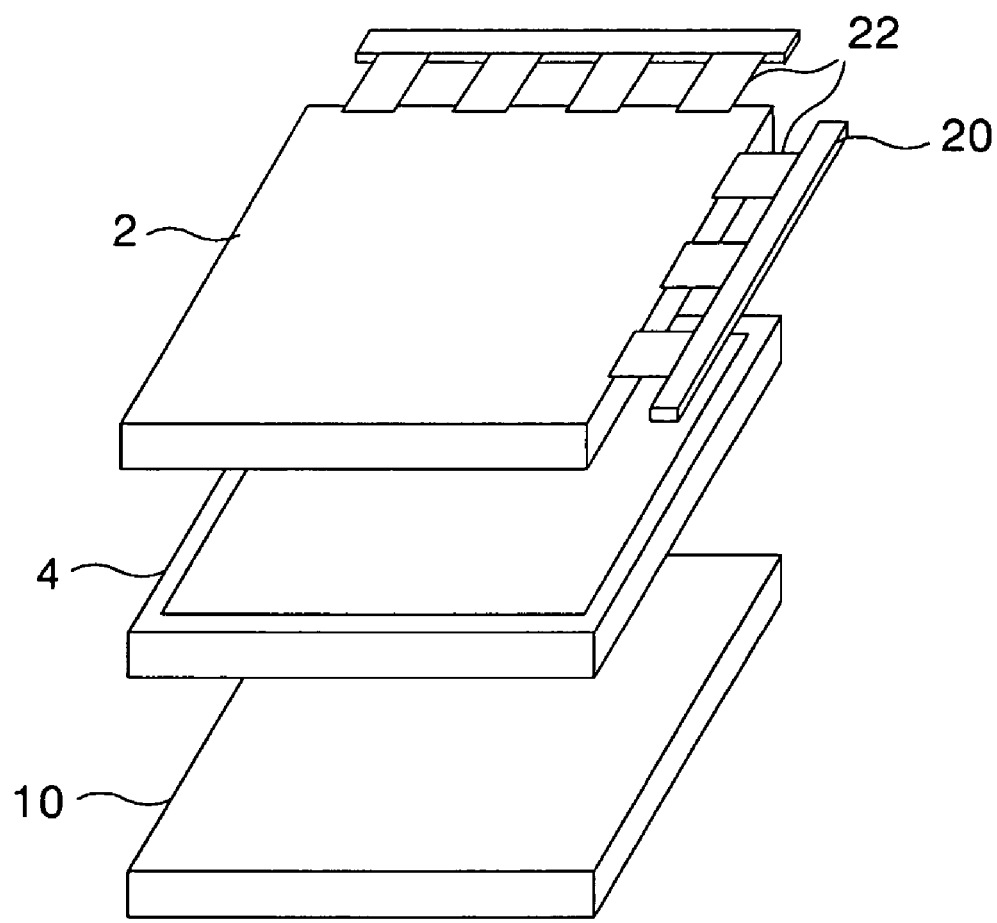
FIG. 1 is a diagram schematically illustrating a liquid crystal display (LCD) device according to the related art.
Figure 2:
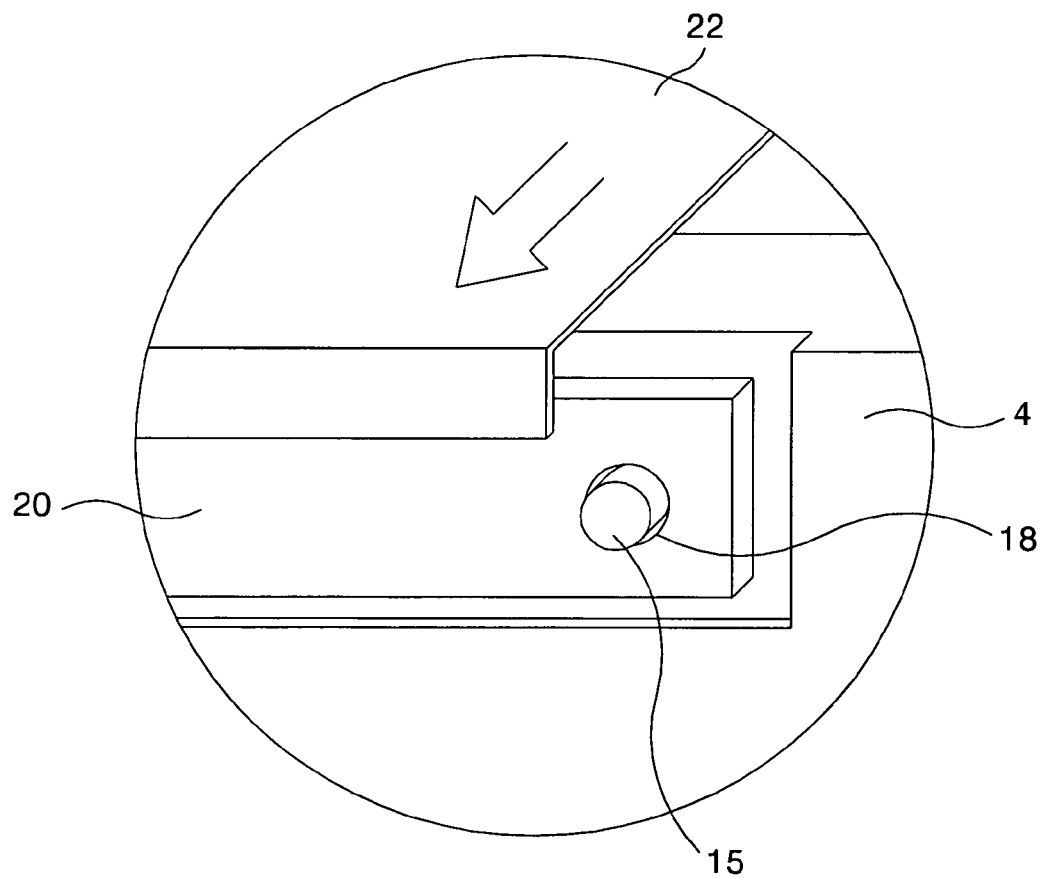
FIG. 2 is a schematic diagram illustrating a structure of fixing a printed circuit board (PCB) to a guide panel in the LCD device of FIG. 1.
Figure 3:
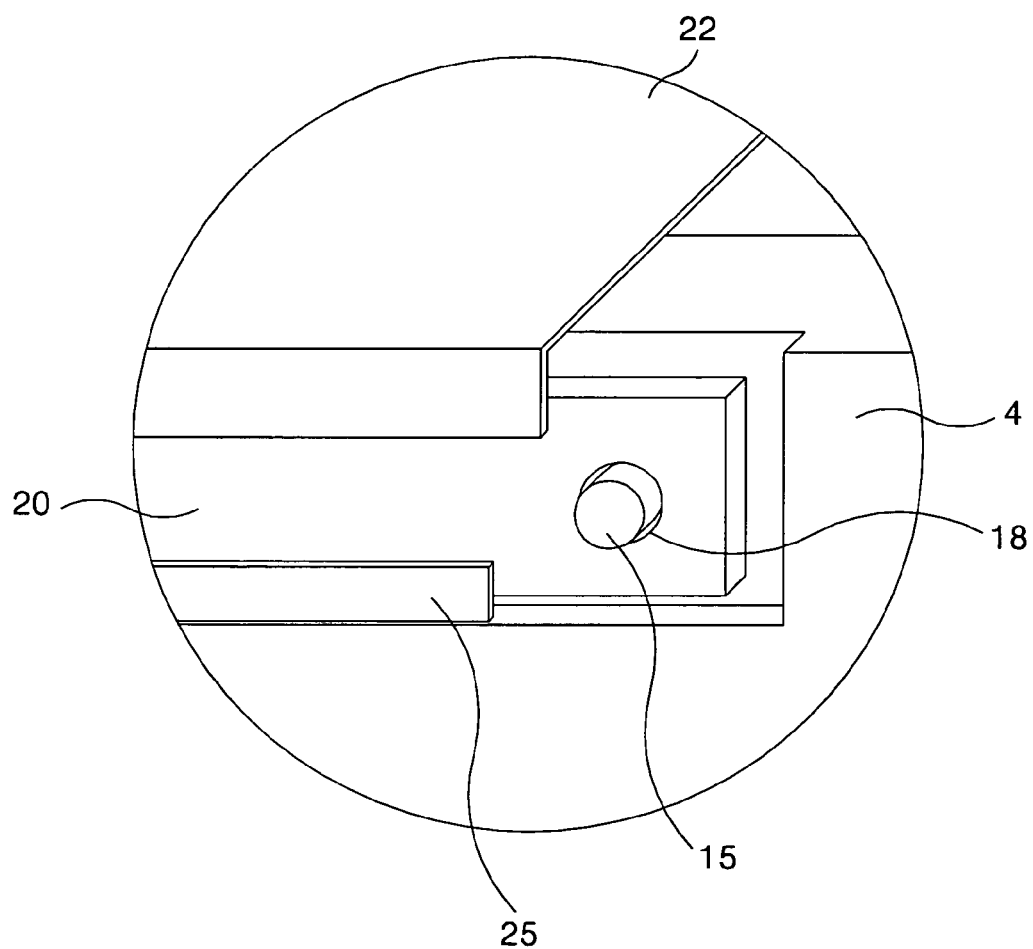
FIG. 3 is a schematic diagram illustrating another structure of fixing the PCB to the guide panel by means of an adhesive silicon pad according to the related art.

According to the fixing structure of the exemplary embodiment, using the upper and lower ribs 140, 180 of the guide panel 104, the PCB 120 does not separate from the guide panel 104 even if the LCD panel 102 moves freely in the direction of the arrow in FIG. 2. In other words, the guide panel 104 is able to fix the PCB 120 to its side surface without using any additional parts such as the silicon pad of the related art. Further, the upper rib 140 and the lower rib 180 are installed in the guide panel 104 so that they are able to move freely in the hinge shape. Such an arrangement ensures that the upper rib 140 and the lower rib 180 move rotatively outward to make the assembly of the PCB 120 and the guide panel 104 easy.

It will be apparent to those skilled in the art that various modifications and variations can be made in the LCD device of the present invention. Thus, it is intended that the present invention covers the modifications and variations of this invention provided they come within the scope of the appended claims and their equivalents.

What is claimed is:

1. A liquid crystal display (LCD) device, comprising:
    an LCD panel;
    a printed circuit board; and
    a guide panel which supports the LCD panel and to which the printed circuit board is fixed, and wherein the guide panel is provided with at least one upper rib, at least one lower rib and at least two PCB supporting plates, wherein the upper rib includes first and second protrusions projected with in the upper surface of the guide panel, and third and fourth protrusions vertically bent in the end of each of the first and second protrusions to face the side surface of the guide panel, wherein the lower ribs dispose the upper rib at locations facing each other, wherein each of the PCB supporting plates is separated from the upper rib and the lower rib with a gap of not less than the printed circuit board thickness therebetween, wherein one end of the printed circuit board insert into a space between the PCB supporting plate of the upper part and the third and fourth protrusions, while the other end of the printed circuit board insert into a space between the PCB supporting plate of the lower part and the lower rib.

2. The liquid crystal display device according to claim 1, further comprising a tape carrier package that connects the printed circuit board to the LCD panel.

3. The liquid crystal display device according to claim 1, wherein the at least one lower rib is formed thinner and slanted outward as it goes to an upper end thereof.

4. The liquid crystal display device according to claim 1, wherein the at least one upper rib is combined to the guide panel in a hinge shape through an elastic member.

5. The liquid crystal display device according to claim 1, wherein the at least one lower rib is combined to the guide panel in a hinge shape through an elastic member.

6. The liquid crystal display device according to claim 1, wherein the at least one lower rib is shaped as any one of tetragonal protrusion, triangular protrusion, and circular protrusion.

* * * * *